(12) United States Patent
Nemirovsky (10) Patent No.: US 6,847,752 B2
(45) Date of Patent: Jan. 25, 2005

(54) INTEGRATED ACTUATOR FOR OPTICAL SWITCH MIRROR ARRAY

(75) Inventor: Yael Nemirovsky, Haifa (IL)

(73) Assignee: Bluebird Optical Mems Ltd., Isfiya (IL)

( * ) Notice: Subject to any disclaimer, the term of this patent is extended or adjusted under 35 U.S.C. 154(b) by 247 days.

(21) Appl. No.: 10/004,312

(22) Filed: Dec. 6, 2001

(65) Prior Publication Data

US 2002/0114558 A1 Aug. 22, 2002

Related U.S. Application Data

(60) Provisional application No. 60/251,977, filed on Dec. 7, 2000.

(51) Int. Cl.$^7$ .............................. G02B 6/00; G02B 6/26
(52) U.S. Cl. ........................................................ 385/18
(58) Field of Search ............................ 385/16–24, 140; 398/115, 118, 119, 130

(56) References Cited

U.S. PATENT DOCUMENTS

| | | | | |
|---|---|---|---|---|
| 4,061,485 A | * | 12/1977 | Rimmel ........................ 65/377 |
| 5,930,531 A | * | 7/1999 | Kitagawa et al. ............. 396/55 |
| 6,297,072 B1 | * | 10/2001 | Tilmans et al. .............. 438/106 |
| 6,498,870 B1 | * | 12/2002 | Wu et al. ....................... 385/18 |
| 6,535,663 B1 | * | 3/2003 | Chertkow ...................... 385/18 |
| 6,574,026 B2 | * | 6/2003 | Jin et al. ..................... 359/224 |
| 2002/0009256 A1 | * | 1/2002 | Chertkow et al. ............ 385/18 |

* cited by examiner

Primary Examiner—Akm Enayet Ullah
(74) Attorney, Agent, or Firm—Edward Langer; Shiboleth, Yisraeli, Roberts, Zisman & Co.

(57) ABSTRACT

An integrated actuator for an optical switch mirror array, which uses a novel integrated actuation technique combining electrostatic or electromagnetic (or both) actuation in combination with air (or any other gas) blast actuation. This combined approach provides integrated actuation, by use of an air (or any gas) blast to move the mirror to a tilt position, and with the application of the proper voltage, to have the pull-in effect take over and move the mirror to its final position. The pull-in effect can be achieved also by a magnetic field. The integrated design provides advantages because the mechanical moment provided by a relatively small air (gas or fluid) blast is significantly larger than the moment available from electrostatic or electro-magnetic actuation at reasonable field strength levels. Thus, the required pull-in voltage can be reduced significantly while allowing manufacture of the mirror structure using superior manufacturing materials employing thicker, crystalline silicon, as opposed to a thin polysilicon layer. This increases reliability and rigidity, and the air (any gas or any fluid) blast will be sufficient to overcome the rigidity to make the mirror motion possible at the right time.

12 Claims, 7 Drawing Sheets

FIG. 5 thickness= 5e-007 [meter]  v= 50 [volt]
length= 0.0003  [meter]
width= 1e-005  [meter]
elastic= 7.000000e+010 [pascal]
srp= 0.1 [atmosphere]

FIG. 6

Spring Moment = k·θ

INTEGRATED ACTUATOR FOR OPTICAL SWITCH MIRROR ARRAY

This application claims the benefit of U.S. provisional application No. 60/251,997 filed Dec. 7, 2000.

FIELD OF THE INVENTION

The present invention relates to optical MEMS (microelectromechanical systems) devices for communication systems, and more particularly, to an actuator integrating electrical and/or magnetic forces as well as mechanical forces for developing switching motion of optical mirrors in a fiber-optic cross-connect switching array.

BACKGROUND OF THE INVENTION

The development of optical fiber networks as a major component in communication systems has driven the development of optical cross-connect switches to enable the full flexibility, safety, and maintenance of these systems. Communication channels which are connected via optical fiber networks use micro-actuated mirrors as optical switches in optical cross-connects, in order to switch individual optical fibers and to enable connection with other optical fibers. The mirror serves to deflect the light from one optical fiber into the other and the mirror is either in a "clear" position or in a "deflecting" position. The object of the technologies devoted to building optical cross-connects is to create systems for movement of these mirrors in individual and programmable fashion. Mirrors which are placed in either one of two positions, either "clear" or "deflecting", are known as 2D or digital. These micro-actuated mirrors are used in free-space switching and make use of MEMS technology.

The main problem with developing commercialized systems based on motion of these mirrors is reliability of the actuated micro-mirrors and manufacturability of the actuated micro-mirrors so that they become a producible item for mass-production and operate properly for the required prolonged duration in the field. In optical cross-connects at the local network level, speed of switching is not the issue as long as it is done in less than 50 msec, but the other issues mentioned previously are more important.

There are two techniques for machining structures onto chips so as to become integrated with them, these are bulk micro-machining of crystalline silicon, and surface micro-machining of polysilicon. Bulk micro-machining is machining of silicon crystals to give them physical features and a three-dimensional form. Surface micro-machining involves application of various structural and sacrificial layers of materials and selective etching techniques to shape the micro-mechanical structures as needed.

The prior art of actuated micro-mirrors is reported in the open literature in publications such as IEEE Journal of "Selected Topics in Quantum Electronics", special issue on Microoptoelectromechanical systems (MOEMS), Vol.5(1), January/February 1999. In particular, prior art is discussed in the paper on "Free-Space Micromachined Optical Switches for Optical Networking", by L. Y. Lin, E. L. Goldstein, and R. W. Tkach (Pages 4–9 in the above journal) and the following papers on Free-Space Optical Switches by H. Toshiyoshi et al. (Pages 10–17 in the above journal), C. R. Giles et al. (Pages 18–25 in the above journal) and A. A. Yasseen et al. (Pages 26–32 in the above journal) and references therein.

Additional prior art is reviewed in the paper by R. S. Muller and K. Y. Lau, "Surface-Micro machined Microoptical Elements and Systems", in Proceedings of the IEEE, August 1998, vol.86, No.8 "Special Issue on Integrated Sensors, Microactuators, and Microsystems", pages 1705–1720. Other papers in the above journal issue summarize the background and basics pertinent to the application of actuated micro-mirrors to Free-Space Optical Switches.

An example of a prior art optical switch actuated micromirror is an AT&T design in which the switch mirror is actuated by a pushrod which causes motion of the mirror about a hinged joint. The mechanical forces acting on the pushrod and mirror cause a gradual weakening of the material from which the joint is made, during repeated cycles of compression and tension of the material. Furthermore, the polysilicon material is thin and therefore fragile. Moreover, because of internal stresses and surface morphology of polysilicon, the performance of the mirrors is not as good as required. Thus, while the advantages of manufacturing using polysilicon are available for construction of the hinged joint, the use of surface-micromachining technology introduces inherent limitations.

The prior art describes, in the paper by Toshiyoshi et al, Journal of Microelectromechanical Systems, Vol. 5, No. 4, December 1996, the use of a polysilicon construction of mirrors on a wafer. The actuation of these mirrors is achieved by electrostatic actuation with a relatively high voltage of approximately 160 volts.

The electrostatic actuation involves the application of a voltage between a pair of metal plates, in a fashion similar to a capacitor, and if one plate is movable by rotation on a torsion beam, ultimately with the right voltage applied, one plate will rotate toward the other. If the movable plate is restrained by the mechanical restoring torque of the torsion beam, the voltage required to draw the plates together will be affected by the spring constant. The pull-in "effect" is defined as a phenomenon in which the electrostatic forces overcome the mechanical forces when the plates are at a certain distance or angle apart, so that the plates will be pulled together. If the movement of the plates is in accordance with an angular displacement, then the movement is a torsional one and the electrostatic torque provides the actuation. The pull-in phenomenon is widely discussed in the literature. See for example the following references and references therein:

[1] S. D. Senturia, "Microsystems Design", Kluwer Academic Press, 2000 {in press).

[2] L. J. Hornbeck, "Deformable-Mirror Spatial Light Modulators", SPIE Critical Review Series, Vol. 1150, Spatial Light Modulators and Applications III, pp. 86–102, 1989.

[3] E. S. Hung and S. D. Senturia, "Extending the Travel Range of Analog-Tuned Electrostatic Actuators", JMEMS, Vol. 8, No. 4, December 1999, pp. 497–505.

[4] P. M. Osterberg and S. D. Senturia, 'M-TEST: A Test Chip for MEMS Material Property Measurement Using Electrostatically Actuated Test Structures', JMEMS, Vol. 6, No. 2, June 1997, pp. 107–118.

[5] O. Degani, E. Socher, A Lipson, T. Leitner, D. J. Seter, S. Kaldor and Y. Nemirovsky, "Pull-In Study of an Electrostatic Torsion Microactuator", JMEMS, Vol. 7, No. 4, December 1998, pp. 373–379.

[6] E. K Chan and R. W. Dutton, "Electrostatic Micromechanical Actuator with Extended range of Travel", JMEMS, Vol. 9, No. 3, September 2000, pp. 321–328.

The axis of rotation of the mirrors, which is called the torsion beam is subject to breakage because of its being very thin. The compliance, or flexibility of the torsion bean, is related to its thickness, so that if a stronger torsion beam is desired, a relatively high electrostatic actuation votage is needed, and this is problematic since it may cause reliability issues. Very high voltages may even cause dielectric breakdown of the electric field in the micro space environment. Some of the problems associated with the use of polysilicon mirrors are reported in the paper. Altogether, the polysilicon mirrors are fragile and may be stressed, thus degrading optical performance. The introduction of high voltage also introduces reliability issues.

Therefore, it would be desirable to provide an optical switch actuated micro-mirror, which features high reliability, and good manufacturability to insure an inexpensive solution for switching of fiber-optic networks in optical cross-connect switches.

SUMMARY OF THE INVENTION

Accordingly, it is a principal object of the present invention to overcome the disadvantages of prior art optical switch designs and provide an integrated actuator for an optical switch mirror array, which uses a novel integrated actuation technique combining electrostatic or electromagnetic (or both) actuation in combination with air (or any other gas) blast actuation. This combined approach provides integrated actuation, thereby allowing the required voltage to be reduced significantly while allowing manufacture of the torsion beams from thicker and much more robust crystalline silicon. The terms air blast and air (fluid) jet are synonymous herein.

The invention utilizes combined and integrated actuation, by use of an air (or any gas) blast to move the mirror to a tilt position, and with the application of the proper voltage, to have the pull-in effect take over and move the mirror to its final position. Thus, the invention can be simply defined as a combination of an air (any gas or any fluid) blast and the electrostatic pull-in effect as applied to micro-actuated mirrors for use in optical switches as well as optical cross-connects which are in communication systems. The pull-in effect can be achieved also by a magnetic field. Therefore, the invention also covers a combination of the gas blast with magnetic actuation with or without electrostatic actuation. The addition of a magnetic force is particularly important since the latter can be used to latch the mirror in case of power failure.

The advantage of use of the air (any gas or any fluid) blast is because the mechanical moment provided by a relatively small air (gas or fluid) pressure difference is significantly larger than the moment available from electrostatic or electromagnetic actuation at reasonable field strength levels. Thus, the mirror structure can be based on use of superior manufacturing materials employing thicker, crystalline silicon, as opposed to a thin polysilicon layer. This will increase reliability and rigidity, and the air (any gas or any fluid) blast will be sufficient to overcome the rigidity to make the motion possible at the right time. The air blast also solves the problem of stiction, similar to an adhesive effect in which the mirror exhibits a sort of stickiness, if it has not been moved over a certain amount of time. There will be always a concern that at the moment it is needed to be moved, the mirror is not flexible in its movement. In this fashion, the air blast overcomes this question and increases the reliability.

The mechanical properties of crystalline silicon are much superior to those of polysilicon. Thus, in accordance with the invention, the manufacturing techniques will be improved, if this material is used. In order to overcome the problem of torsion beam flexibility, the air blast is integrated in the motion system and the motion system becomes an integration or a combination of mechanical and electrostatic and or magnetic forces. Reliability is increased considerably by the use of thicker crystalline silicon, which does not age, as well as by the considerable reduction of the actuation voltage.

The use of an air (any gas or any fluid) blast to assist the electrostatic or electromagnetic actuation is achieved by applying the air blast to the mirror to develop an angular position which is sufficient for the electrostatic or electromagnetic actuation to overtake the spring moment or restoring mechanical torque of the rotation axis. This can be achieved at a moderate or low voltage, thereby increasing reliability. The assistance provided by the air blast enables the construction to benefit from a thicker axis of rotation which is not subject to breakage and is not fragile as with the prior art design.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

Figures 1A, 1B, 1C:
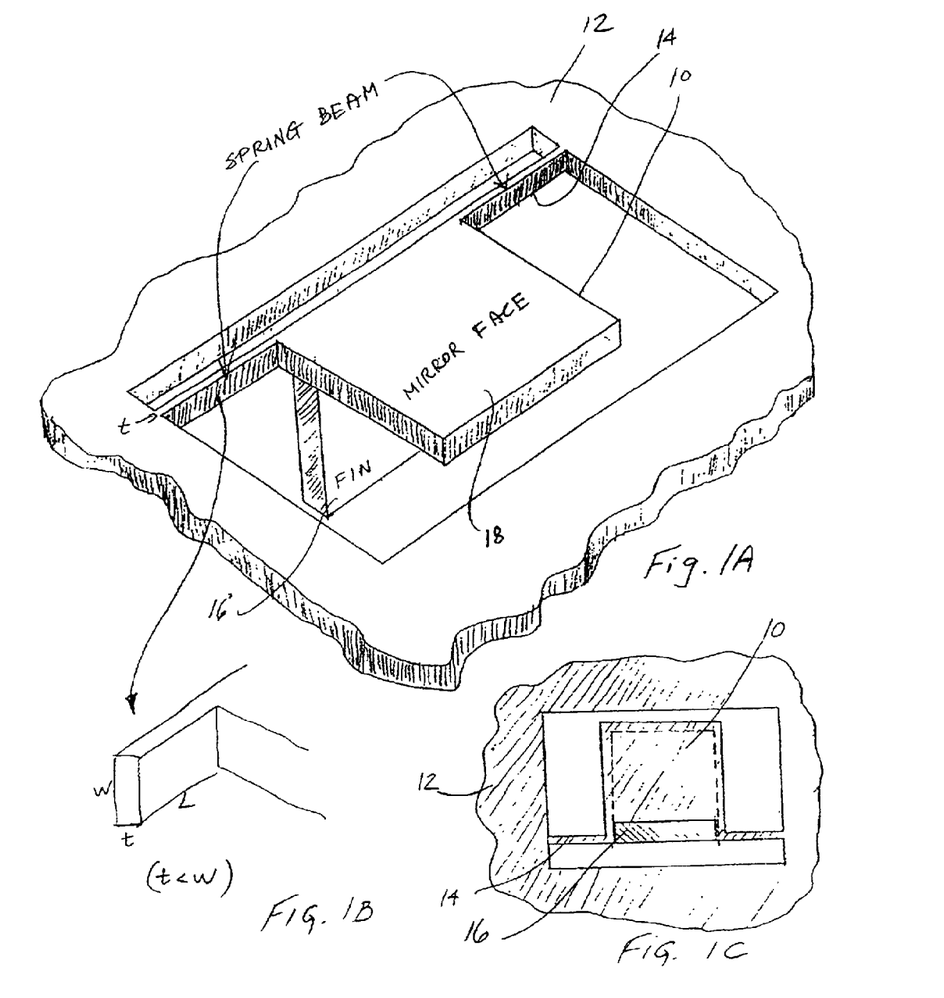
FIGS. 1a–c are respectively, perspective, detail and underside views illustrating a microactuated optical switch mirror constructed and operated in accordance with the principles of the present invention.

Referring now to FIGS. 1a–c, there is shown a microactuated optical switch mirror 10 constructed and operated in accordance with the principles of the invention. The mirror 10 is fabricated on a silicon wafer 12 such that it is hinged on a torsion beam 14, and has a fin 16 extending in perpendicular fashion downwardly from the mirror face 18. Torsion beam 14 is described by its dimensions, width w, thickness t, and length L. The above is an example of a specific design and other designs are also possible within the framework of the present invention. In particular, more than one fin can be designed, in order to increase the efficiency of the air (gas or fluid) blast. A fluid blast may be utilized if the entire volume of the device is filled in a suitable fluid.

Figure 2:
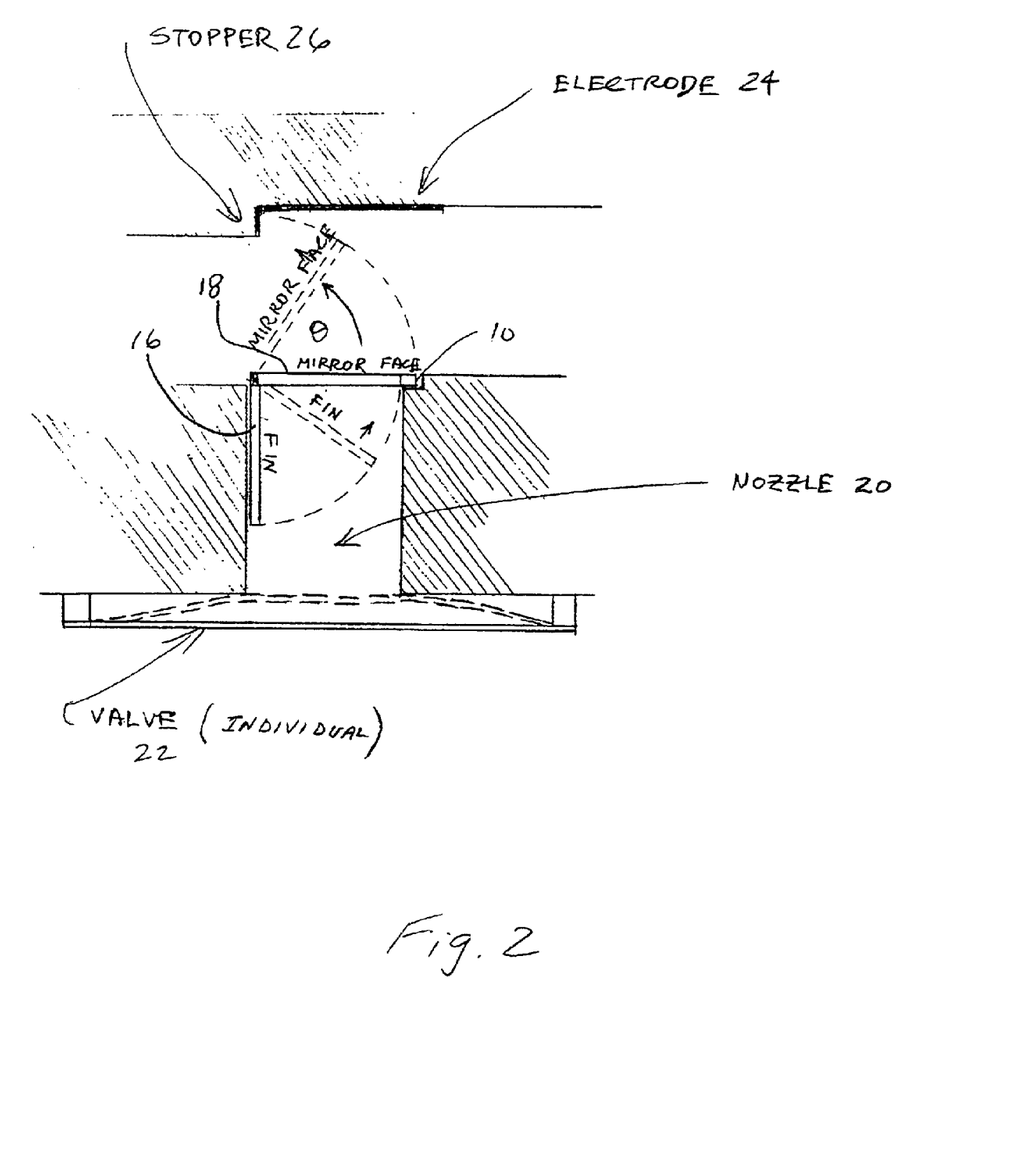
FIG. 2 is a side view of the optical switch mirror shown in FIG. 1.

In the side view of FIG. 2, optical switch mirror 10 is shown arranged for actuation by an integrated actuation technique combining electrostatic actuation and air blast actuation.

The optical switch mirror 10 is designed in the described example as an L-shaped mirror, which is subjected to an air blast via nozzle 20 and air valve 22, so that it begins to rotate, and the electrostatic actuation is applied to electrode 24. The L shape provided by fin 16 enables the air blast to continue providing a push force against the restoring torque of the axis, even when the mirror face is at a relatively high angle, since the L-shaped portion provided by fin 16 (at the bottom) will still be in the air blast path and this will continue to contribute to this motion. The L-shaped mirror bottom portion is provided by fin 16 which traps the air flow, and although this fin can be applied as an L-shaped design, it can also be applied in a T-shaped design or other designs, including combinations of several fins attached to the same mirror. By trapping the air flow, the fin 16, assists in developing sufficient force which contributes to continued motion of the mirror 10 to its final position, at which it rests against the stopper 26 and cannot move any further, and is kept at this position by the electrostatic force.

Figure 3:
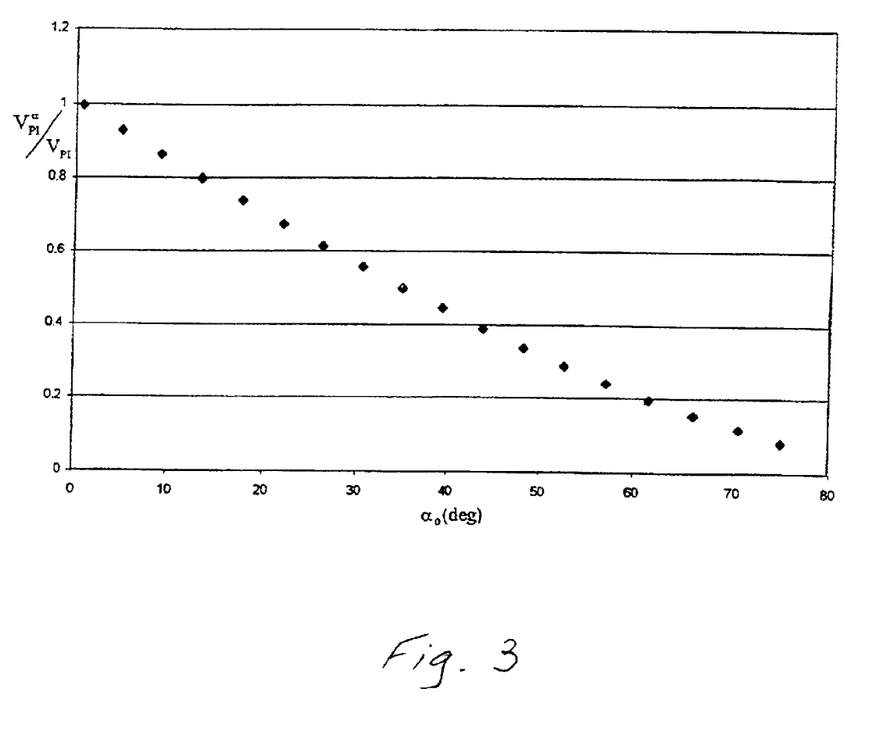
FIG. 3 is a graph showing the relationship of electrostatic actuation voltage and the angular position of the optical switch mirror.

The graph of FIG. 3 introduces the concept of electrostatic actuation versus the angular position of the mirror 10, showing that as the angular position of the mirror 10 increases, the electrostatic voltage required to overtake the restoring torque is reduced with increased angular position FIG. 3 shows the effect of an external torque on the pull-in voltage, since the external torque tilts the mirror to an angle $\alpha_0$, and by applying a voltage as shown, the pull-in effect is achieved at a reduced voltage.

However, this approach still does not enable the construction to have a thick axis of rotation, so that the electrostatic voltage by itself does not achieve the desired effect. The issue of a fragile torsion beam becomes critical below 1 micron thickness. Therefore, an increased thickness of above 1 micron is desired. However, the voltage that would be required to overcome a thicker torsion beam is significant, and it is too high.

Figure 4:
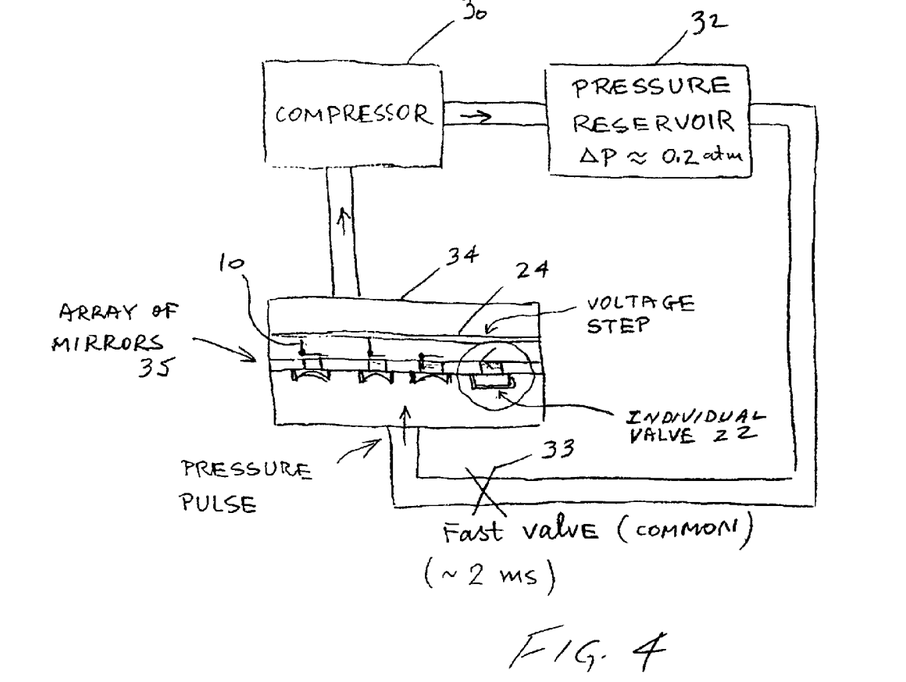
FIG. 4 is a schematic diagram showing an integrated actuation system for an optical switch mirror constructed and operated in accordance with the principles of the invention.

The system diagram of FIG. 4 shows a compressor 30 which is applied for developing the air (gas or fluid) pressure at 1.1 Atm. The overpressure or increased pressure is stored in a pressure reservoir 32 of compressed air (gas or fluid), and is released through a quick valve 33 to a pressure chamber 34 to create a pressure pulse through the individual valve 22 which feeds the particular mirror that is to be switched at that time, so that individual air flow blasts can be directed as desired to individual ones of the array of mirrors 10. The individual valves 22 which allow for air flow against an individual mirror 10 are valves which are activated in one of several ways, including electrostatic actuation, piezoelectric actuation, or other suitable actuation to allow for closure and opening of the individual valves. The system diagram of FIG. 4 also shows the air flow completed in a closed system back to the compressor 30 to secure a clean and pure air flow jet in the closed system. The mirror array 35 may thus be packaged as a closed system which does not allow the inflow or exit of external air. It is also possible to design a closed system filled with a gas different from air, or even a closed system filled with a suitable fluid.

An important feature of the invention is the minimal amount of additional pressure required for the air blast which is only as little as 0.1–0.2 Atm to achieve the mirror motion.

Figure 5:
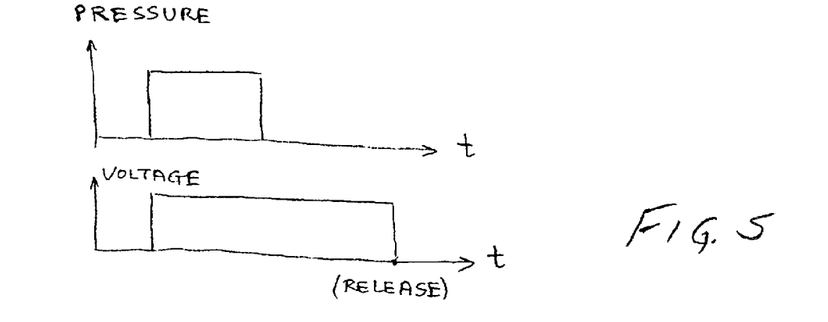
FIG. 5 illustrates an air blast and voltage pulse as a function of time.

The graph of FIG. 5 illustrates air (or any gas or fluid) blast and voltage pulses as a function of time, namely the timing sequence of the combined actuation.

Figure 6:
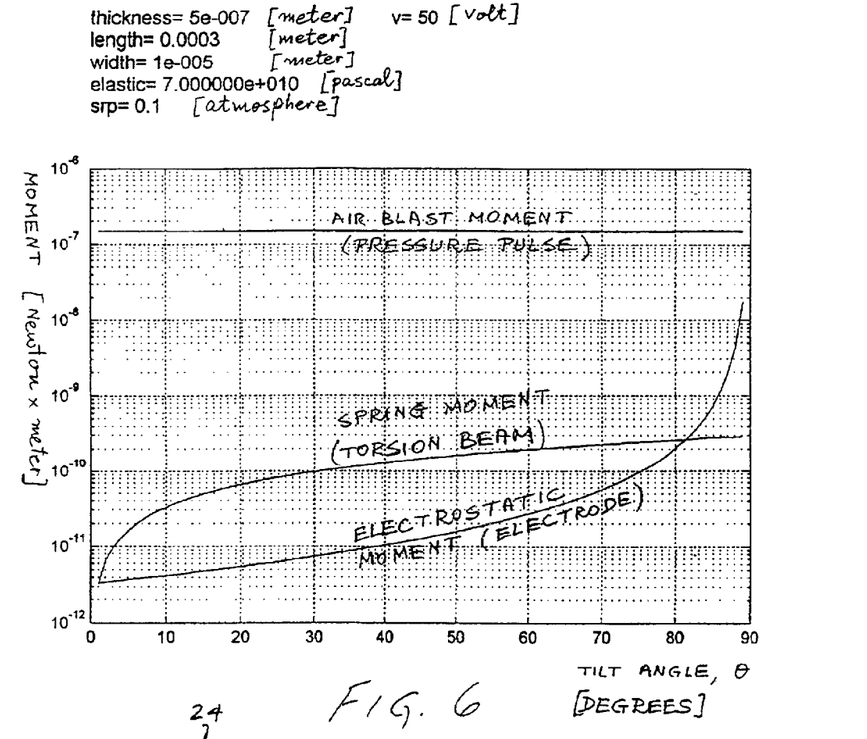
FIG. 6 is a graph illustrating the relationship of the restoring torque and the angular position of the optical switch mirror.

In the graph of FIG. 6, the restoring mechanical torque is compared with the electrostatic moment provided by the electrostatic actuation, at the 50 volt level, with a torsion beam thickness of 0.5 micron. Since the two forces (torques) are opposing one another, the graph shows a theoretical arrangement in which the restoring torque is above the electrostatic moment until a certain point is reached, but since the mirror has an initial position which is horizontal and not vertical, it will never overcome the mechanical restoring torque by itself so that for a torsion beam thickness above 2 microns, the spring moment cannot be overcome by the electrical moment in and of itself, within a reasonable voltage range.

Figure 7:
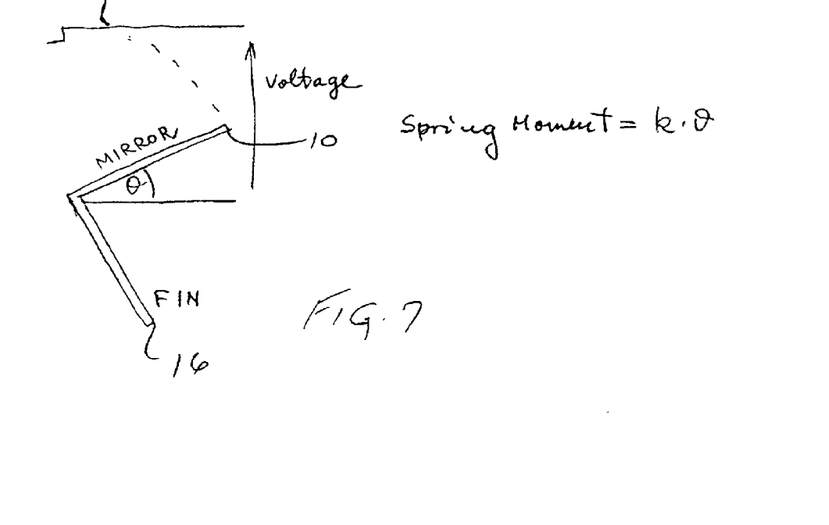
FIG. 7 illustrates the relationship between the angular position and the voltage.

In addition, this graph also shows an air blast moment (in this example, resulting from 0.1 atm overpressure) which is approximately constant and does not depend on the angle of the mirror because during its angular rotation, it benefits from the force developed against the fin 16 as shown in FIG. 7. This air blast moment is several orders of magnitude greater than the mechanical restoring force of the torsion beams (which is the spring moment), and therefore it overcomes this opposing force rather easily. Once the angle θ of the mirror has achieved a certain value close to approximately 82 degrees, the electrostatic actuation overtakes and therefore the air blast no longer is applied. The entire operation takes several milliseconds.

Figure 8:
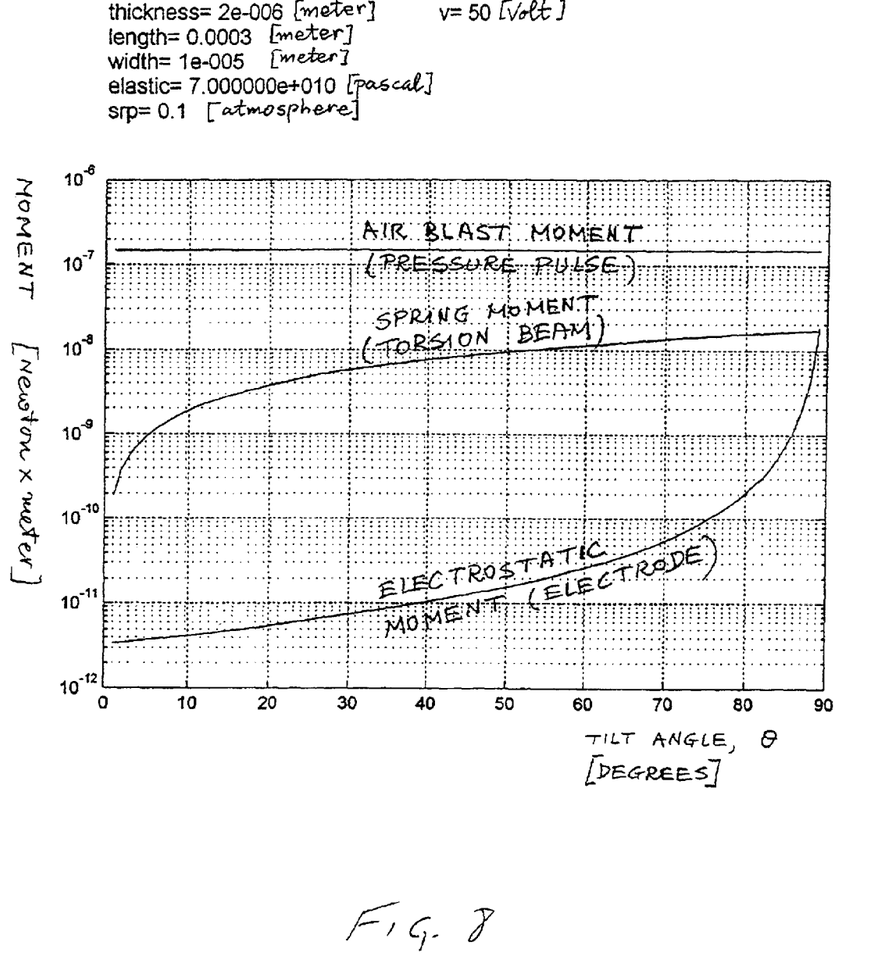
FIGS. 8–9 are graphs illustrating the relationship of the restoring torque represented as resulting from a spring constant, and the angular position of the optical switch mirror, for a given electrostatic actuation voltage, mirror dimensions and torsion beam thickness and other dimensions.

FIG. 8 shows a graph in which the torsion beam thickness is increased to 2 microns, and the electrostatic moment is at a 50 volt electrostatic actuation level. Here, the spring moment is overcome by the electrostatic moment at approximately 89 degrees, due to the increased torsion beam thickness over the value of FIG. 6.

Figure 9:
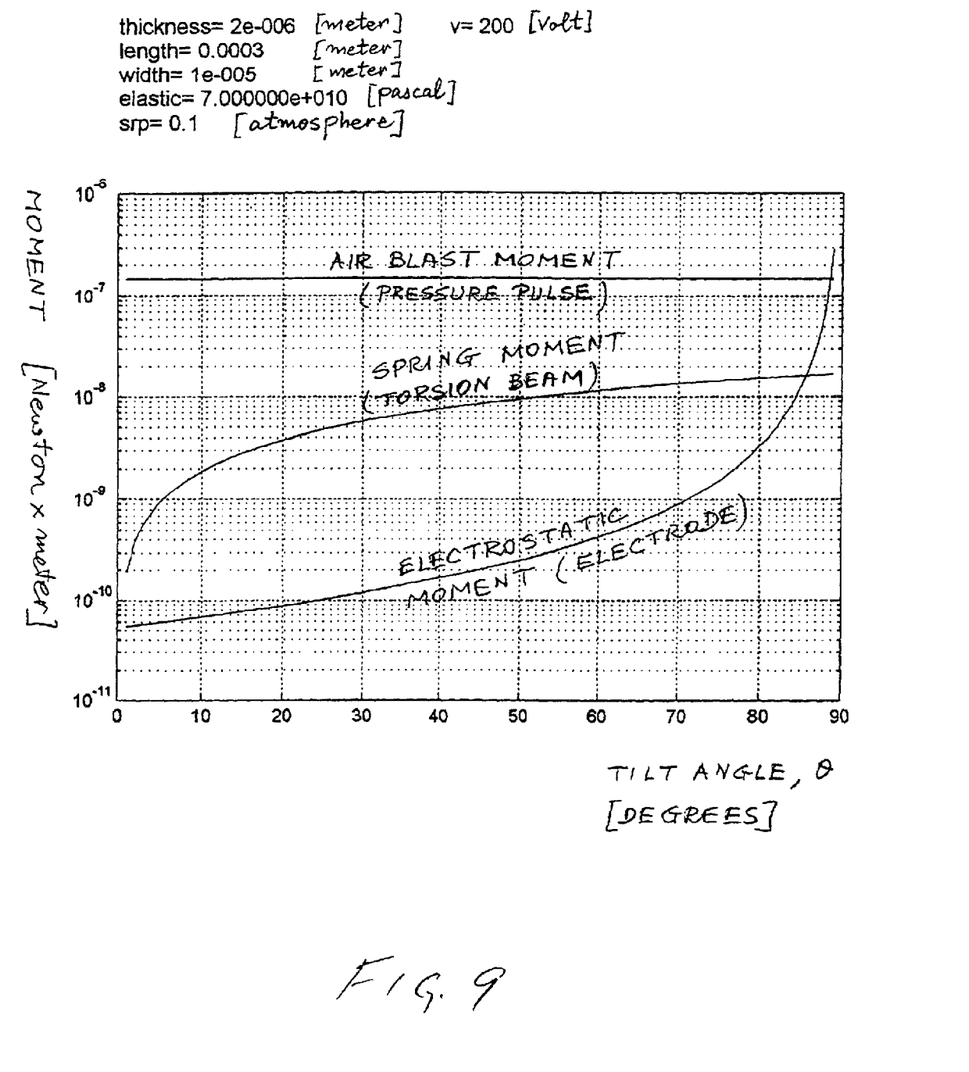

FIG. 9 shows a graph in which the torsion beam thickness remains 2 microns, but the electrostatic moment is increased to a 200 volt electrostatic actuation level. Here, the spring moment is overcome by the electrostatic moment at approximately 85 degrees, which is reduced from the tilt angle in FIG. 8, because of the increase in the electrostatic moment. However, as can be seen, the increased electrostatic moment does not significantly reduce the tilt angle at which the electrostatic moment overtakes. This shows that the air blast moment dominates in developing the tilt angle.

As shown in the examples of FIGS. 6 and 8–9, the air blast is dominant, and quickly establishes the tilt angle of mirror 10 at a sufficient value for the pull-in effect to take over and bring the mirror 10 to its final position.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

I claim:

1. An integrated actuator for an optical switch mirror array used in optical communication systems, said integrated actuator comprising:

means for applying a non-electromagnetic tilting push force to a mirror, against an underside thereof and against a fin extending from said underside for developing an initial tilt position of said mirror as it rotates about a torsion beam, said tilting force application means comprising a gas blast apparatus providing said tilting push force as a pulse, and means for applying an electromagnetic pull-in force to complete the tilt of said mirror to its final optical switching position beyond said initial tilt position in the mirror array.

2. The actuator of claim 1 wherein said means for applying a pull-in force comprises an electrostatic generator for generating an electrostatic force.

3. The actuator of claim 1 wherein said means for applying a pull-in force comprises a magnetic generator for generating a magnetic force.

4. The actuator of claim 1 wherein said means for applying a pull-in force comprises a combination of electrostatic and magnetic generators for generating a combined electrostatic and magnetic force.

5. The actuator of claim 1 wherein said fin extends from said underside of said mirror in substantially perpendicular fashion.

6. The actuator of claim 1 wherein said fin extends from said underside of said mirror in an inclined fashion, to enhance and prolong the effect of the blast.

7. The actuator of claim 1 further comprising a plurality of fins extending from said underside of said mirror in combined perpendicular and inclined fashion.

8. A combined actuator for an optical switch mirror array used in optical communication systems, said integrated actuator comprising a combined actuation mechanism based upon a pulsed gas flow providing a mechanical, non-electromagnetic tilting push force and an electrostatic pull-in force.

9. A combined actuator for an optical switch mirror array used in optical communication systems, said integrated actuator comprising a combined actuation mechanism based upon a pulsed gas flow providing a mechanical, non-electromagnetic tilting push force and a magnetic generator providing a magnetic pull-in force.

10. A method of actuating a micro-mirror in an optical switch mirror array used in optical communication systems, said method comprising:

applying a mechanical, non-electromagnetic tilting push force to bring the mirror to a tilted position, and applying at least one of an electrostatic and magnetic force to achieve pull-in to complete the tilt of the mirror to its final optical switching position, said tilting push force application being performed by a gas blast apparatus providing said tilting push force as a pulse.

11. A method of actuating a micro-mirror in an optical switch mirror array used in optical communication systems, said method comprising:

applying a mechanical, non-electromagnetic tilting push force to bring the mirror to a tilted position, and applying a combination of an electrostatic and magnetic force to achieve pull-in to complete the tilt of the mirror to its final optical switching position, said tilting push force application being performed by a gas blast apparatus providing said tilting push force as a pulse.

12. The method of claim 11 wherein said combined electrostatic and magnetic force achieve pull-in to complete the tilt of the mirror to its final optical switching position, and wherein said magnetic force ensures latching in said final position, even if there is a power failure.

* * * * *